US006970970B2

(12) United States Patent
Jung et al.

(10) Patent No.: US 6,970,970 B2
(45) Date of Patent: Nov. 29, 2005

(54) METHOD OF STORING DATA IN A NON-VOLATILE MEMORY AND APPARATUS THEREFOR

(75) Inventors: Im-young Jung, Daejeon (KR); Sung-ik Jun, Daejeon (KR); Kyo-il Chung, Daejeon (KR); Yong-sung Jeon, Daejeon (KR); Heon-young Yeom, Seoul (KR)

(73) Assignee: Electronics and Telecommunications Research Institute, (KR)

( * ) Notice: Subject to any disclaimer, the term of this patent is extended or adjusted under 35 U.S.C. 154(b) by 289 days.

(21) Appl. No.: 10/348,711

(22) Filed: Jan. 22, 2003

(65) Prior Publication Data

US 2004/0064635 A1    Apr. 1, 2004

(30) Foreign Application Priority Data

Oct. 1, 2002    (KR) ...................... 10-2002-0059763

(51) Int. Cl.⁷ ............................................. G06F 12/00
(52) U.S. Cl. ...................... 711/103; 711/167; 707/202
(58) Field of Search ................................ 707/100, 200, 707/202; 711/103, 167, 169

(56) References Cited

U.S. PATENT DOCUMENTS

| 6,721,765 B2 * | 4/2004 | Ghosh et al. ................ 707/202 |
| 6,732,124 B1 * | 5/2004 | Koseki et al. ............... 707/202 |
| 2002/0059275 A1 * | 5/2002 | Schofield .................... 707/100 |
| 2002/0184436 A1 * | 12/2002 | Kim et al. ................... 711/103 |
| 2003/0131023 A1 * | 7/2003 | Bassett et al. .............. 707/200 |

FOREIGN PATENT DOCUMENTS

| JP | 2001-092713 | 4/2001 |
| JP | 2001-147855 | 5/2001 |

OTHER PUBLICATIONS

Jung, Im Y., et al.,, "A Transaction Implementation Method for Devices with Restricted Resources", The 12th Joint Conference in Communications and Information, Apr. 24, 2002 (with English translation).
Jung, Im Y., et al., "A Proposal to Implement Vew-Value Logging in Java Card Transaction", The 6th World Multiconference on Systemics, Cybernetics and Informatics, Jul. 14, 2002, pp. 229-233.

* cited by examiner

*Primary Examiner*—Gary Portka
*Assistant Examiner*—Jasmine Song
(74) *Attorney, Agent, or Firm*—Blakely, Sokoloff, Taylor & Zafman

(57) ABSTRACT

Provided is a method of storing data in a non-volatile memory, including generating and storing logs including data to be stored and an address of the non-volatile memory in response to a data-writing request, and comparing addresses of the logs and storing data corresponding to the same page by the unit of page in a corresponding area of the non-volatile memory. The method makes it possible to minimize delay in storing data, reduce the number of accesses to the non-volatile memory and uniformly write data in the whole non-volatile memory, thereby minimizing a response time of the non-volatile memory and increasing the lifetime of the non-volatile memory.

13 Claims, 9 Drawing Sheets

METHOD OF STORING DATA IN A NON-VOLATILE MEMORY AND APPARATUS THEREFOR

BACKGROUND OF THE INVENTION

1. Field of the Invention

The present invention relates to a method of storing data and an apparatus therefor, and more particularly, to a method of and apparatus for storing data in a non-volatile memory.

2. Description of the Related Art

An electrically erasable and programmable read only memory (EEPROM) as a non-volatile memory of a data storage device, such as a smart card, can write and read data by a unit of page at a time. If data has to be written on two pages in the EEPROM, a delay of 3 through 10 ms occurs before data is written on the second page. This time delay exists even when the data is written on the same page while a time gap exceeds 150 microseconds. This time delay causes delay in the smart card response time.

In addition, the life span of the EEPROM is determined based on the number of writes on the EEPROM, and it may be shortened by one spot where data is written more than a hundred thousand times. Therefore, it is desirable that data is written uniformly in the whole EEPROM.

In the conventional art, there have been developed a logging method for transaction processing, a method of synchronizing data in the smart card with backup of the data outside the smart card, and a method of reducing costs in transaction processing. However, implementations of the above methods have not been introduced yet. Moreover, the conventional art has problems in that delay appear when writing data in the EEPROM and the EEPROM has a short life span because data is written too frequently by the unit of log in the EEPROM.

In addition, in the conventional art, any detailed approach for memory management has not been provided, and a spot of the EEPROM, such as a transaction buffer, is too frequently used and the life span of the spot ends, and the EEPROM cannot be used any more although other spots can be used.

SUMMARY OF THE INVENTION

To solve the above-described and related problems, it is an object of the present invention to provide a method of storing data in a non-volatile memory, the method which makes it possible to minimize delays in storing data, reduce the number of accesses to the non-volatile memory, and uniformly write data in the whole non-volatile memory, thereby reducing a response time of the non-volatile memory and expanding the life span of the non-volatile memory, and an apparatus therefor.

The present invention also provides a computer readable recording medium having embodied thereon a computer program for executing the method of storing data in a non-volatile memory.

In an aspect, the present invention provides a method of storing data in a non-volatile memory, the method comprising, in response to a data-writing request, generating and storing logs including data to be stored and an address of the non-volatile memory, and comparing addresses of the logs and storing data corresponding to the same page by the unit of page in a corresponding area of the non-volatile memory.

In another aspect, the present invention provides a data storage device comprising a non-volatile memory, a log generating unit which generates and stores logs having data to be stored and addresses of the non-volatile memory in response to a data-writing request, and a data storage unit which compares addresses of the logs and stores data corresponding to the same page in a corresponding area of the non-volatile memory.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE INVENTION

The present invention will now be described more fully with reference to the accompanying drawings, in which preferred embodiments of the invention are shown.

Figure 1:
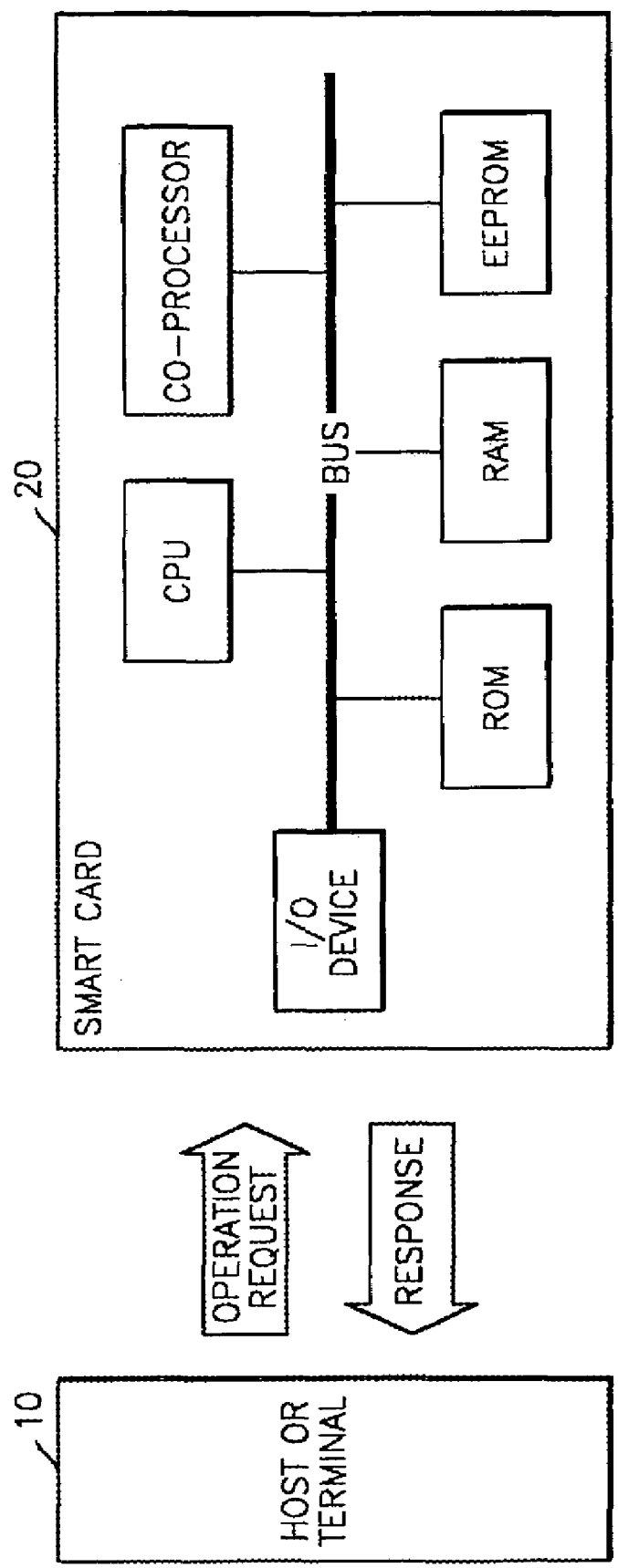
FIG. 1 shows a conceptual view of a structure of a smart card and a system utilizing the smart card.

FIG. 1 shows a conceptual view of a structure of a smart card and a system utilizing the smart card. In a host or terminal 10, operation requests for application programs, which activate the smart card, are generated by client programs. A non-volatile memory, such as an EEPROM, and a volatile memory, such as a random access memory (RAM), are included in a smart card 20. The smart card 20 includes the application programs as a server capable of processing the operation requests generated in the host or terminal 10.

Figure 2:
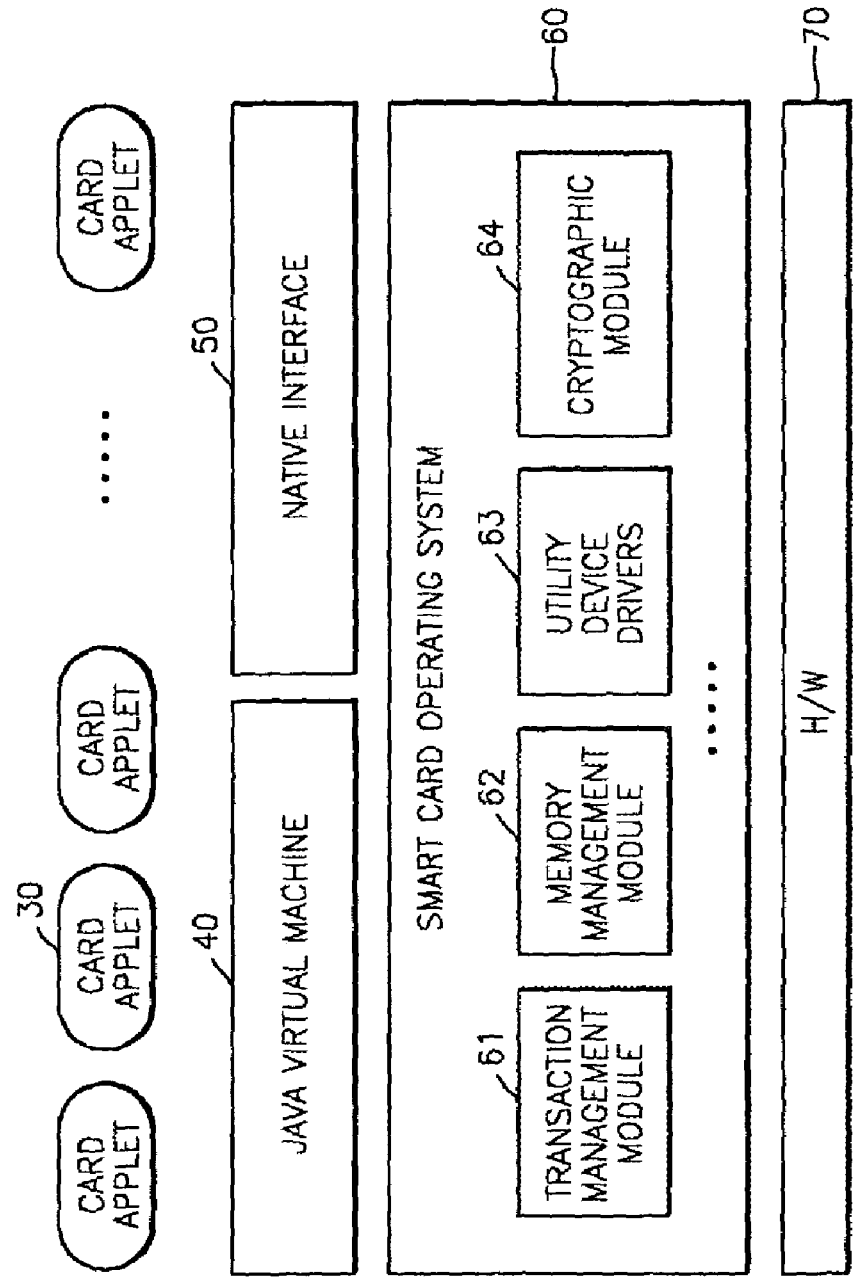
FIG. 2 is a conceptual view of an application program used in a smart card.

FIG. 2 is a conceptual view of an application program used in a smart card. The application programs, which are included in the smart card 20, are card applets 30 that are constituted of Java codes, and thus a smart card having a platform capable of executing application programs such as the card applets 30 is called "Java (smart) card". Here, the Java (smart) card denotes a smart card that has a Java (smart) card application program running platform. The Java (smart) card application program running platform provides application programs, which are constitute of Java codes, to a smart card. In the Java (smart) card, a smart card operating system 60 in which module units are included for transaction processing is not the java-based, instead, a Java virtual machine 40 is usually placed over the smart card operating system 60 to run the Java application program. Accordingly, transaction management of a transaction management module 61 can be applied to the transaction processing in other kinds of smart card as well as in the Java (smart) card.

In order to run a Java applet, the Java virtual machine 40 is placed on the smart card operating system 60, and a native interface 50 exists for connecting the Java virtual machine 40 with the smart card operating system 60. The transaction management module 61, a memory management module 62, utility device drivers 63, and a cryptographic module 64 are included in the smart card operating system 60. The transaction management module 61 manages a transaction process related to the present invention. The memory management module 61 manages the use of the memory, and the utility device drivers 63 include device drivers used for a contacting area with card hardware (HAN) 70, and other useful utilities. The cryptographic module 64 manages cryptographic operations.

In order to guarantee atomicity in writing data to the non-volatile memory and consistency of data between the application programs, a transaction is performed upon the unit to be particularly protected.

The data-writing request in the non-volatile memory needs the transaction processing to guarantee atomicity. However, there are also some writing requests which do not need to be particularly protected in the transaction processing. In general, a log is generated in response to the data-writing request within the transaction processing. However, the same kind of the log can also be generated in response to data-writing request outside the transaction, and delayed writing is applied. Hereinafter, the present invention will be described mainly with respect to data writing within the transaction processing, but this description will be also applied to the data writing outside the transaction.

Figure 3:
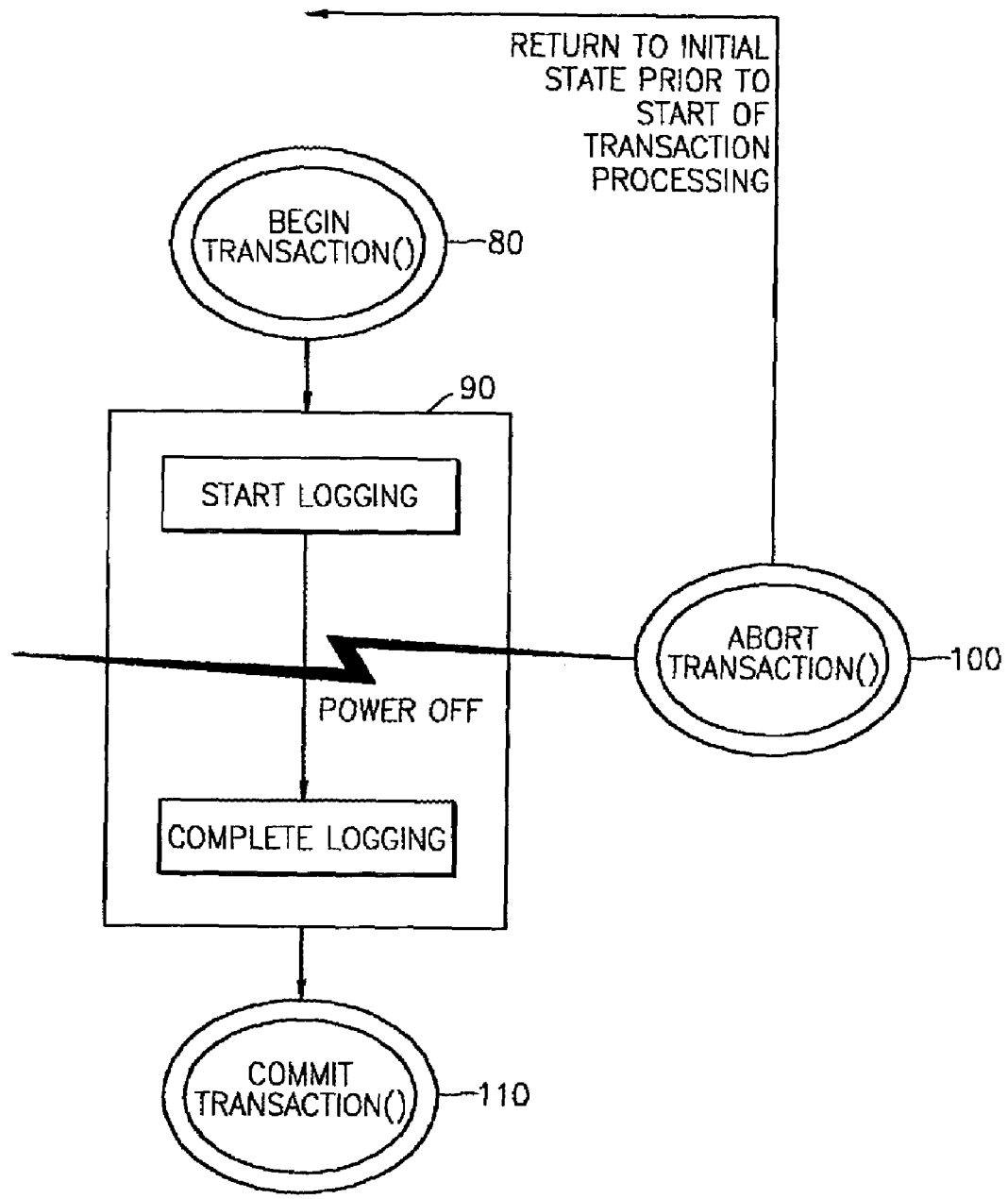
FIG. 3 is a flowchart showing transaction processing in a smart card.

FIG. 3 is a flowchart showing transaction processing in a smart card that processes the transaction management module 61 of FIG. 2.

Upon receiving a beginTransaction ( ) 80 that requests the start of the transaction processing to the smart card operating system 60, the transaction management module 61 continues logging 90 until it receives a commitTransaction ( ) 110 that requests completion of transaction processing to the smart card operating system 60. Logging can be divided into old-value logging and new-value logging according to an order of logging of data, the data to be updated during the transaction processing.

In the old-value logging, log is generated by producing backup of the data to be updated and corresponding addresses. In the new-value logging, log is directly made of the data to be updated and corresponding addresses. Since costs of old-value logging and new-value logging in commit transaction processing and abort transaction processing are different, the more appropriate one of two loggings is selected according to use environment. In the smart card 20, the possibility of card tear is high during transaction processing. Accordingly, new-value logging is more appropriate because cost in abort transaction processing is lower in new-value logging.

When power supply to the smart card 20 is interrupted during logging, or if it is determined that transaction processing cannot be performed any more, the transaction management module 61 calls abortTransaction ( ) 100 that requests the stop of the transaction processing, and then the system returns to an initial state prior to start of the transaction processing.

Figure 4A:
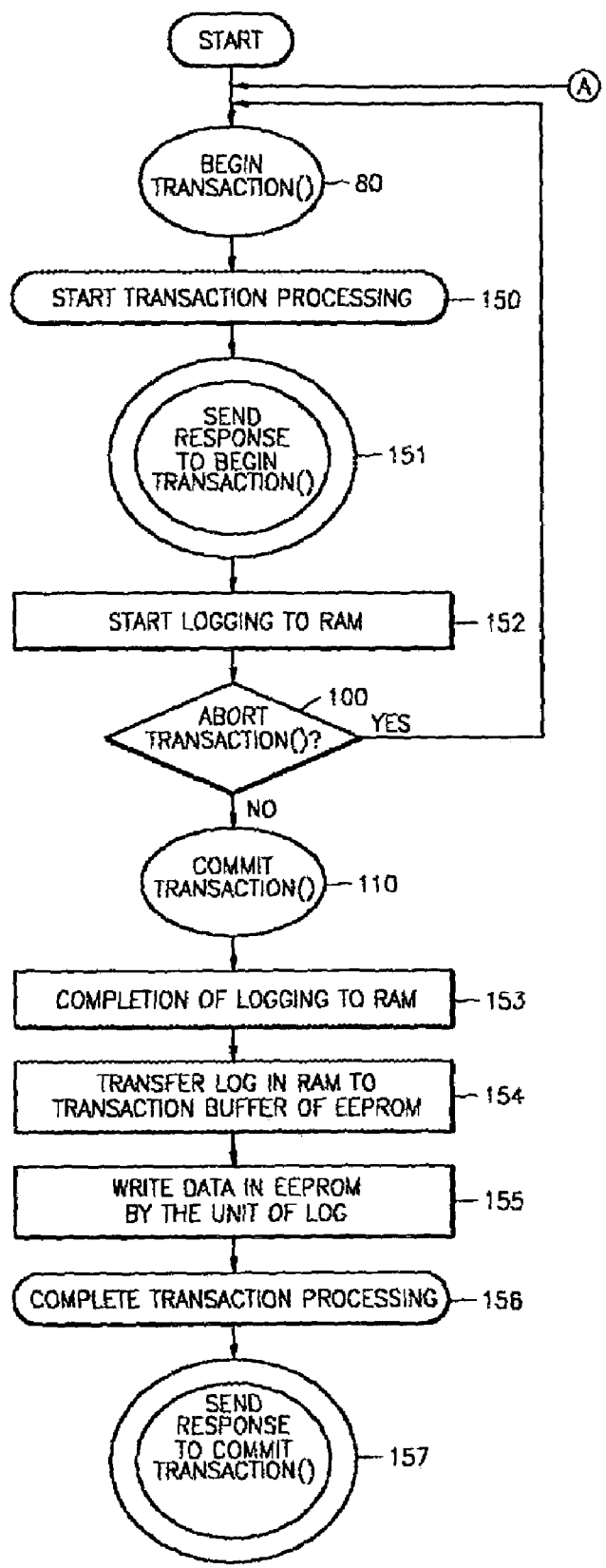
FIGS. 4A and 4B are flowcharts showing a method of storing data by the unit of log in a smart card according to the conventional new-value logging.
Figure 4B:
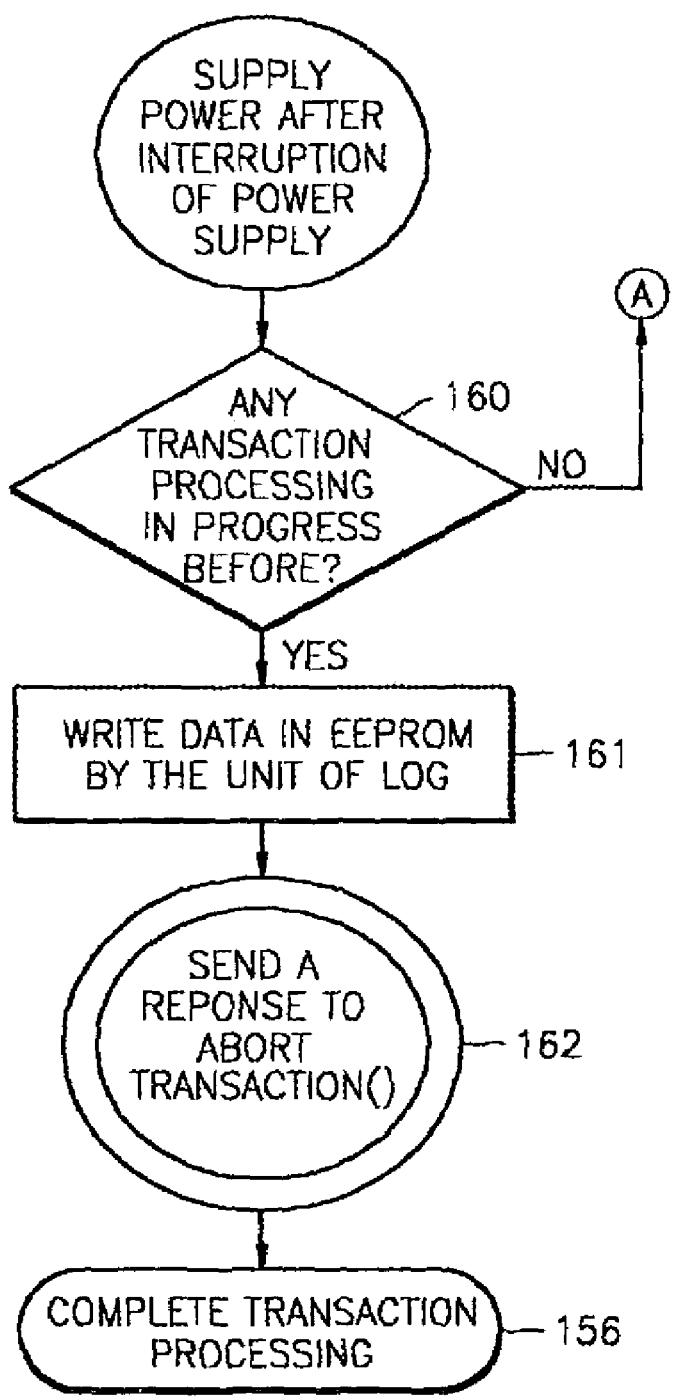
Figure 5A:
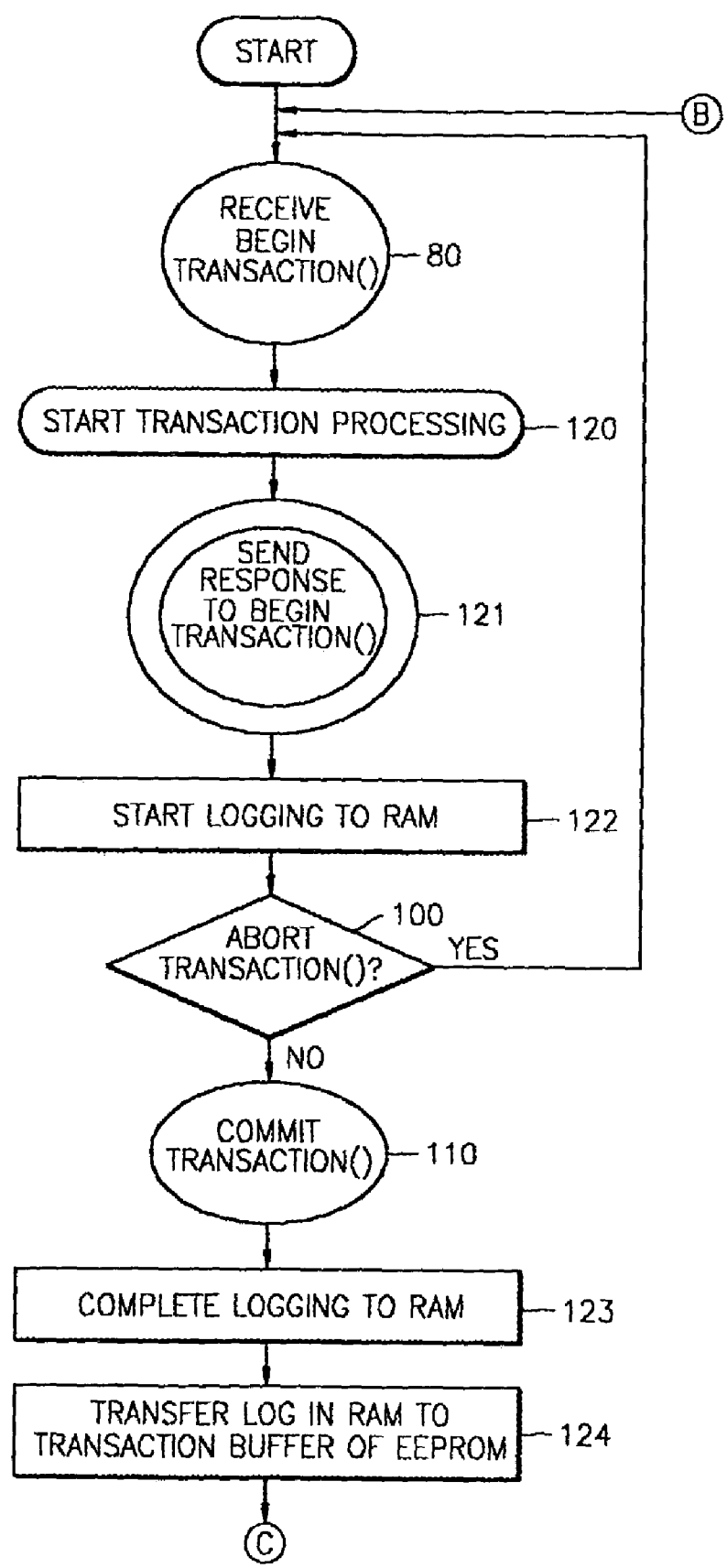
FIGS. 5A, 5B, and 5C are flowcharts showing a method of storing data by the unit of page in a smart card, according to an embodiment of the present invention.
Figure 5B:
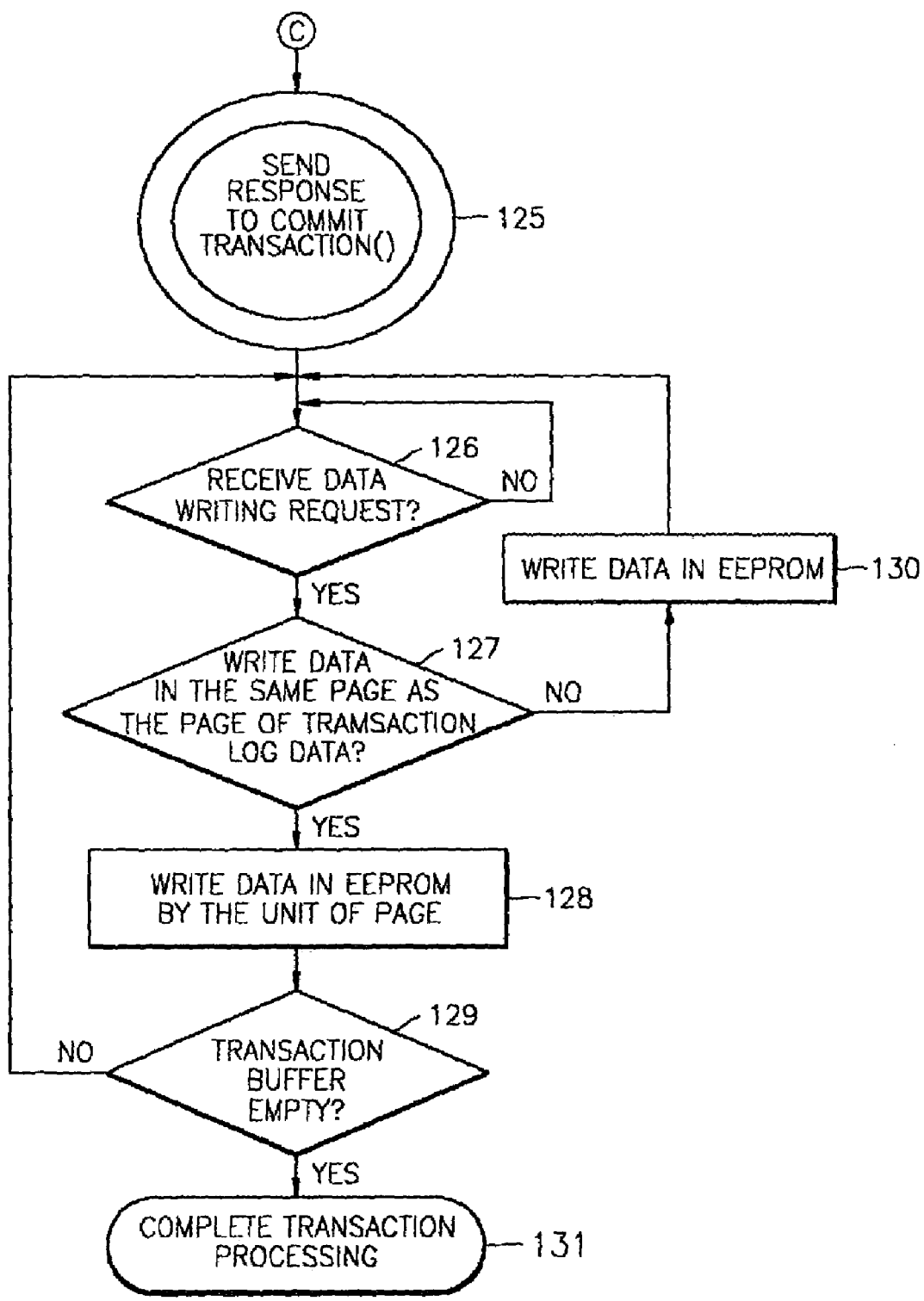
Figure 5C:
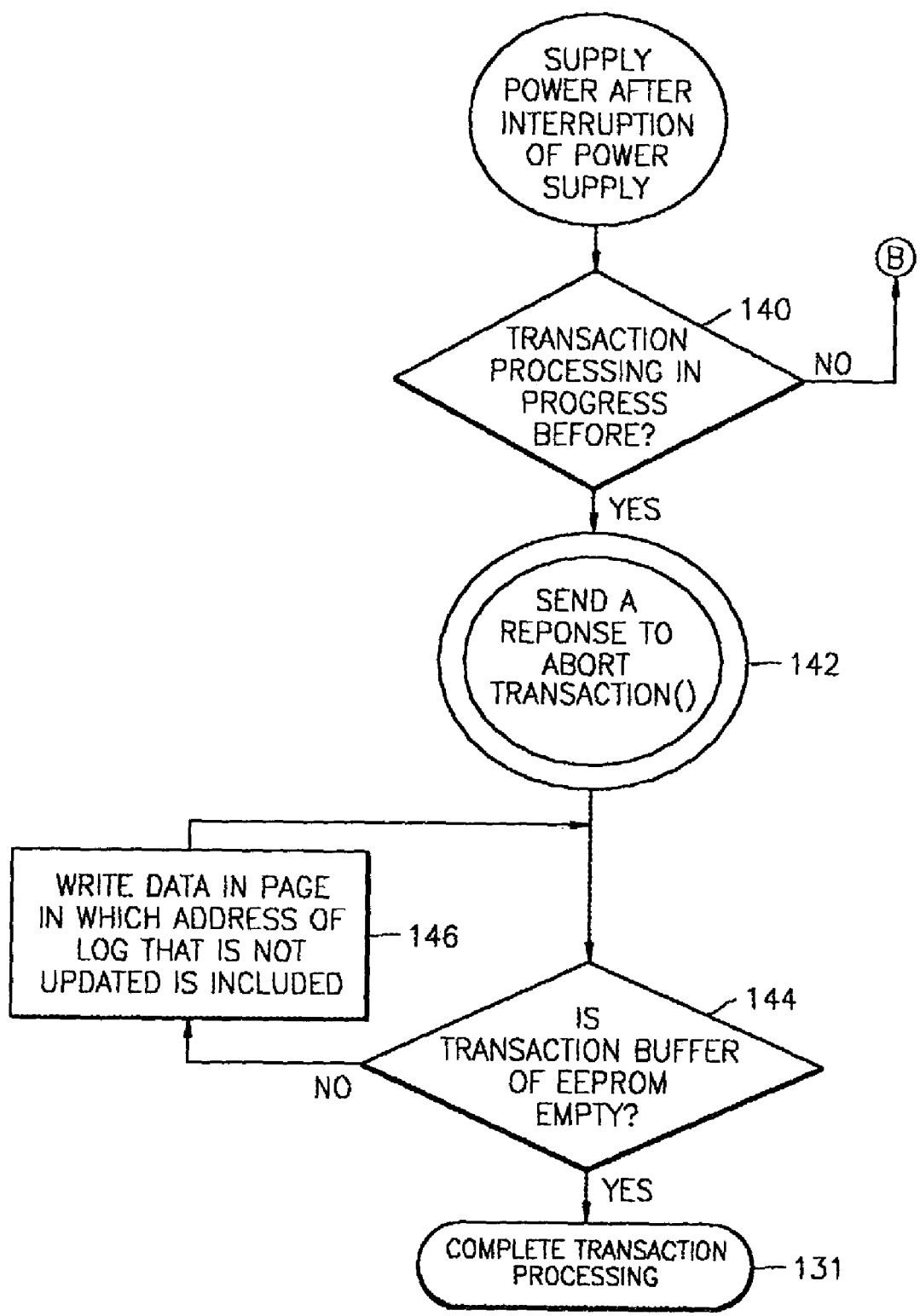

FIGS. 4A and 4B are flowcharts showing a method of storing data by the unit of log according to the conventional new-value logging. FIGS. 5A, 5B, and 5C are flowcharts showing a method of storing data by the unit of page in a smart card according to an embodiment of the present invention. Because the present invention is based on new-value logging, data update by the unit of page and delayed writing of the present invention will be described by comparing FIGS. 4 and 5.

FIGS. 4A, 5A, and 5B illustrate a normal flow where transaction processing is normally performed from receiving beginTransaction ( ) 80 to receiving commitTransaction ( ) 110. FIGS. 4B and 5C illustrate a flow when card tear occurs, which means that power supply to the smart card 20 is interrupted during the transaction processing and power is supplied again. However, FIGS. 4B and 5C can also be applied to a case where abortTransaction ( ) 100 is called during transaction processing instead of power interrupt.

If the system receives beginTransaction ( ) 80 that requests the start of the transaction processing, it enters a state of the transaction processing by setting a flag indicating that the smart card 20 is under transaction processing (steps 120 and 150). A response to beginTransaction ( ) 80 is sent to a host or terminal 10 which calls beginTransaction ( ) 80 (steps 121 and 151). Then, logging is performed to RAM according to each data-writing request (steps 122 and 152).

Logging is performed by storing the address of the non-volatile memory to store the data, and the content of the data, in the RAM.

It is determined that whether abortTransaction ( ) 100 is received, and if abortTransaction ( ) is received, the system goes back to the state prior to step 80. If commitTransaction ( ) 110 is called during logging, logs written in the RAM are transferred to the transaction buffer of the EEPROM (steps 124 and 154).

In the conventional new-value logging of FIG. 4A, data is written to the appropriate location of EEPROM according to the log by the unit of log (step 155), and thus the response to the commitTransaction ( ) is sent after all contents of EEPROM is updated according to the logs. That is, the smart card 20 is blocked while all contents of the memory are updated, and thus a delay occurs. After that, the smart card 20 enters a state of completion of the transaction processing (step 156), and a response to commitTransaction ( ) 110 is sent to a host or terminal 10 (step 157).

Referring to FIGS. 5A and 5B for the present invention, after logs of the RAM are transferred to the transaction buffer of the EEPROM (step 124), a response to commitTransaction ( ) 110 is sent to a host or terminal 10 (step 125). Thus, a host or terminal 10 is in states of completion of the transaction, while the smart card operating system 60 is in a state of transaction processing.

When a data-writing request is sent to the EEPROM, it is checked whether logs are left in transaction buffer (step 126). If there are logs left, the system searches the logs which contain the address that belongs to the same page as the address for the data-writing request (step 127). All the logs corresponding to the same page to which the address of the data-writing request belongs are searched, and the data of all the logs corresponding to the same page are updated at once (step 128). If corresponding logs do not exist, only the data for data-writing request is updated (step 130).

Updating the data by the unit of page means reading the page of the non-volatile memory to be updated, storing the page in the RAM, writing data in the page of RAM, and writing the contents of the page of RAM in the page of the non-volatile memory by the unit of page at a time. When all the logs are updated, the smart card 20 enters a state of completion of the transaction processing (step 131).

FIG. 4B illustrates a flow when card tear occurs, that is, when power supply to the smart card 20 is interrupted, in the conventional new-value logging. If the power is supplied again, it is determined whether any transaction processing was in progress (step 160), and data is written in the EEPROM by the unit of log if transaction processing was in progress (step 161). After that, a response to abortTransaction ( ) 100 is sent, and the smart card 20 enters a state of completion of the transaction (step 156).

FIG. 5C illustrates a flow when power supply is interrupted during logging in a method of storing data by the unit of page according to the present invention. It is determined whether any transaction processing was in progress (step 140). The data for the logs left in the transaction buffer are updated by the unit of page if there was no transaction in progress. However, the logs remaining in the transaction buffer can be handled later, which gives flexibility.

In case of FIG. 4B, abortTransaction ( ) 100 is called to handle parts of the transaction buffer which are not updated. If card tear occurs during updating, all logs of data are updated again by the unit of log ignoring previous updating (step 161).

However, in case of FIG. 5C, if logs in RAM are not transferred to the transaction buffer of the EEPROM when abortTransaction ( ) 100 is called, the smart card 20 goes just to state prior to the transaction. If logs are transferred to the transaction buffer of EEPROM, the updated pages are not updated again, and remaining pages other than the updated pages are updated by the unit of page. Therefore, according to the present invention, in a contactless card where the possibility of card tear is high, costs for handling are much lower than the conventional art.

If the transaction buffer is empty (step 144), the smart card 20 enters a state of completion of the transaction (step 131). A response to abortTransaction ( ) 100 is sent when an external state goes back to a state prior to the transaction (step 142) whereas the response to abortTransaction ( ) 100 is sent when the transaction buffer of the EEPROM is empty (step 162) in FIG. 4B. In the present invention, the update of transaction buffer is delayed because logs remaining in the transaction buffer can be handled in the time gap between transactions, or they can be handled while the logs for next transaction are written to RAM. Thus, the cost is minimized for the writing between transactions.

Figure 6:
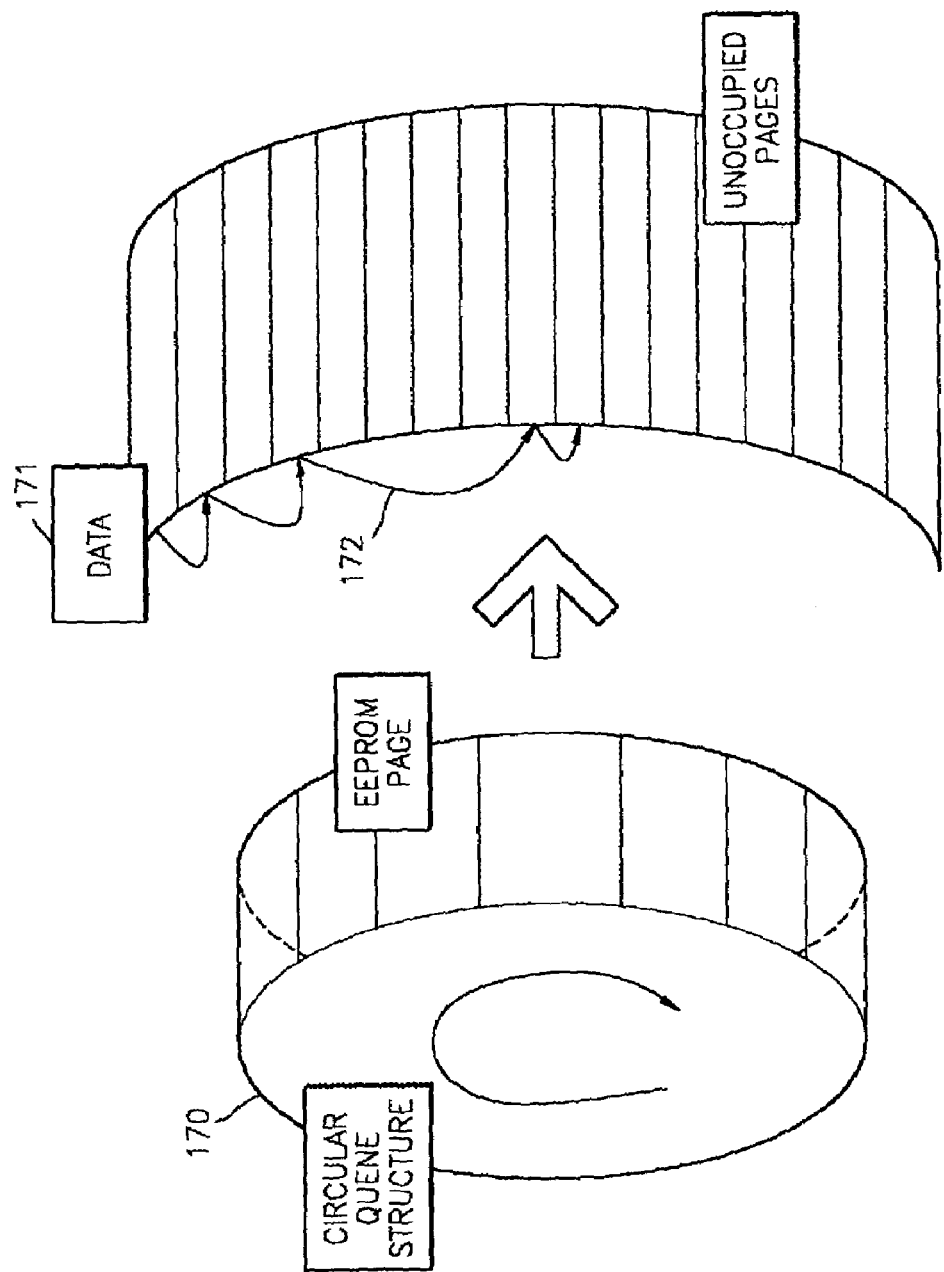
FIG. 6 is a conceptual view of a transaction buffer.

FIG. 6 is a conceptual view of a transaction buffer. In the conventional art, the transaction buffer is always used from its front part to rear part. Thus, usually, the front part is used more than the rear part. In order to solve this problem, an occupied page 171 and an unoccupied page are distinguished and managed as a linked list 172. The pages are usually managed as a circular queue structure 170. However, since the pages are not always occupied consecutively, it is possible to give preference to the unoccupied page by indicating an order of using the pages through the linked list 172 so that the unoccupied pages can be occupied first later. The whole memory of the EEPROM can be also managed like this.

As described above, the method of storing data in a non-volatile memory according to the present invention reduces the number of write accesses to the EEPROM and delays in a time response by reducing the time lost by the delayed writing. That is, logs generated by the data-writing request are treated separately according to pages of EEPROM, and only one access to the EEPROM is needed in each page by updating the logs by the unit of page at a time. Such update by the unit of page is very efficient considering the time lost which is inevitable in the EEPROM. The transaction buffer of EEPROM is managed by a circular queue structure or a linked list for uniformly using the pages. Write update by the unit of page or management of the memory in the EEPROM according to the present invention can also be applied to writing or managing of the whole memory of the smart card. It is also possible to delay updating of the data until the CPU is available. The management of the transaction buffer by the linked list makes overlapped transactions and multiple transactions possible in the smart card because many linked lists can be provided if logs of one transaction are provided to each list. The overlapped transaction may be implemented by including logs of a sub-transaction in one list.

In the implementation of transaction for the device having a limited memory including the non-volatile memory, we should consider hardware characteristics of the memory, and which of them will be given priority. If the performance of the memory is important, a response time, a memory capacity needed by the device, and the lifetime of the device have to be considered. If the service is provided directly to a user and the response time is important in the service, the memory capacity needed and the lifetime of the device can be properly adjusted. If characteristics of the application program of the device are considered, more appropriate transaction processing may be implemented. If the number of logs generated during transaction processing is usually small, the old-value logging can be used. However, if data of addresses corresponding to one page or two pages of the EEPROM is required to be updated, the data can be updated by the method of storing data according to the present invention, and it can provide an improved response time.

The present invention may be embodied as a computer readable code (including devices having an information processing function) on a computer readable medium. The computer readable medium includes storage media on which computer readable data are stored. The computer readable storage media include ROM's, RAM's, CD-ROM's, magnetic tapes, floppy disks, floppy disks, etc.

As described above, according to a method of storing data in a non-volatile memory, it is possible to shorten the delays in storing data, reduce the number of accesses to the non-volatile memory, and uniformly write data in the whole non-volatile memory, thereby shortening a response time of the non-volatile memory and expanding the lifetime of the non-volatile memory.

While this invention has been particularly described with reference to preferred embodiments thereof, it will be understood by those skilled in the art that various changes in form and details may be made therein without departing from the spirit and scope of the invention as defined by the appended claims and equivalents thereof.

What is claimed is:

1. A method of storing data in a non-volatile memory, the method comprising:
   (a) in response to a data-writing request, generating and storing logs in a volatile memory, including data to be stored and an address of the non-volatile memory; and
   (b) comparing addresses of the logs and storing data corresponding to the same page by the unit of page in a corresponding area of the non-volatile memory, and wherein step (b) further comprises:
   (b1) copying the logs of the volatile memory to a transaction buffer of the non-volatile memory;
   (b2) comparing the addresses of the data logged in the transaction buffer to addresses for the data-writing request and searching for the logs in the transaction buffer which contains the data logged with the addresses corresponding to the same page as the address for the data writing request;
   (b3) copying the page of the non-volatile memory which the address for the data writing request belongs to, to the volatile-memory;
   (b4) storing the data for the writing request in a page area of the volatile memory at the location with its same offset in a page of the non-volatile memory;
   (b5) storing the data logged in the page area of the volatile memory according to the logs corresponding to the same page;

(b6) copying the page of the volatile memory to the page area of the non-volatile memory in order to update the page area of the non-volatile memory; and (b7) removing the logs reflected to update the page of the non-volatile memory from the transaction buffer in the non-volatile memory.

2. The method of claim 1, wherein step(b) further comprises storing the logs of the volatile memory in a transaction buffer of the non-volatile memory wherein the transaction buffer has a structure of one of a queue, a circular queue, and a linked list.

3. A method of storing data in a non-volatile memory, the method comprising:
  (a) upon receipt of a request for start of transaction processing, generating a log including data to be stored and an address of the non-volatile memory in response to the data-writing request until a request for completion of transaction processing is received;
  (b) upon receipt of the request for completion of transaction processing, storing the logs in a transaction buffer of the non-volatile memory;
  (c) comparing addresses of the logs in the transaction buffer to addresses of the data-writing request and storing data from the transaction buffer corresponding to the same page of the data-writing request in a corresponding area of the non-volatile memory by the unit of page;
  (d) updating the non-volatile memory by unit of page; and step (c) further comprises:
  (c1) comparing addresses of the data logged in the transaction buffer with the addresses of the data-writing request and searching for the logs in the transaction buffer corresponding to the page the data is logged belongs to, wherein the page the data is logged to belongs to the same page as the address for the data-writing request;
  (c2) copying the pages of the non-volatile memory which the address for the data-writing request belongs to, to the volatile memory;
  (c3) storing the data in a page area of the volatile-memory according to the logs corresponding to the same page as the address for the data-writing request;
  (c4) copying the page of the volatile memory to a page area of the non-volatile memory; and
  (c5) removing the logs from the transaction buffer corresponding to the same page.

4. The method of claim 3 wherein step (c) comprises comparing addresses of the non-volatile memory required by the data-writing request and the addresses of the logs in the transaction buffer upon receipt of the data-writing request and storing data corresponding to the same page in the corresponding area of the non-volatile memory by the unit of page.

5. The method of claim 4, wherein step (c) further comprises:
  (c1) determining whether the logs of which addresses are included in the same page as the page in which the address required by the data-writing request exist;
  (c2) if the logs exist, storing the data in a corresponding page of the non-volatile memory according to the logs and the data-writing request; and
  (c3) if the logs do not exist, storing data in a corresponding page of the non- memory according to the data-writing request.

6. The method of claim 5, wherein the method is implemented in a device having a volatile memory, and step (c2) further comprises:
  (c21) copying a page of the non-volatile memory required by the data-writing request to the volatile memory;
  (c22) storing data in a corresponding are of the volatile memory according to the logs and the data-writing request;
  (c23) copying the corresponding area of the volatile memory to a page area of the non-volatile memory; and
  (c24) removing the logs.

7. The method of claim 3, wherein if a request for stop of transaction processing is received during step (a), the logs generated in step (a) are removed, and the method is performed again from step (a) for the next transaction.

8. The method of claim 3, wherein if a request for stop of transaction processing is received during step (b) before all the logs are stored in the transaction buffer, the logs stored in the transaction buffer are removed, and the method is performed again from step (a) for the next transaction.

9. The method of claim 3, wherein step (b) comprises storing logs separately according to pages of the non-volatile memory in the logs.

10. The method of claim 3, wherein steps (a) through (c) are performed for consecutive transaction processing, and step (c) of transaction processing and step (a) of next transaction processing are performed in parallel.

11. The method of claim 3, wherein the transaction buffer in which the logs are stored has a structure of one of a queue, a circular queue, and a linked list.

12. A data storage device comprising:
  a non-volatile memory;
  a log generating unit which in response to a data-writing request generates and stores logs having data to be stored and addresses of the non-volatile memory in response to a data-writing request in a volatile memory; and
  a data storage unit which compares addresses of the logs stored in the volatile memory with addresses of the data-writing request stores data corresponding to the same page in a transaction buffer of the non-volatile memory having the structure of a linked list and updates the non-volatile memory with data from the volatile memory and the transaction buffer corresponding to the same page by unit of page.

13. A computer readable medium having embodied thereon a computer program for performing the steps of:
  (a) in response to a data-writing request, generating and storing logs in a volatile memory including data to be stored and addresses of the non-volatile memory;
  (b) transferring the logs of the volatile memory to a transaction buffer of a non-volatile memory having the structure of a linked list; and
  (c) comparing the addresses of the logs of the data-writing request to the logs of the transaction buffer and storing data corresponding to the same page in a corresponding area of the non-volatile memory by the unit of the page.

* * * * *